United States Patent
Chiu et al.

(10) Patent No.: US 8,643,606 B2
(45) Date of Patent: *Feb. 4, 2014

(54) METHOD FOR SCROLL BAR CONTROL ON A TOUCHPAD AND TOUCHPAD WITH SCROLL BAR CONTROL FUNCTION

(75) Inventors: Yen-Chang Chiu, Taipei County (TW); Yung-Lieh Chien, Taoyuan County (TW); Zhi-Long Wu, Taipei County (TW)

(73) Assignees: Elan Microelectronics Corporation, Hsinchu (TW); Elan Tech Devices Corporation, Taipei (TW)

( * ) Notice: Subject to any disclaimer, the term of this patent is extended or adjusted under 35 U.S.C. 154(b) by 836 days.

This patent is subject to a terminal disclaimer.

(21) Appl. No.: 12/230,890

(22) Filed: Sep. 8, 2008

(65) Prior Publication Data

US 2009/0009366 A1 Jan. 8, 2009

Related U.S. Application Data

(63) Continuation-in-part of application No. 11/171,430, filed on Jul. 1, 2005, now Pat. No. 8,378,973.

(30) Foreign Application Priority Data

Jul. 5, 2004 (TW) .............................. 93120151 A

(51) Int. Cl.
*G06F 3/041* (2006.01)

(52) U.S. Cl.
USPC ...................... 345/173; 178/18.01; 178/19.01

(58) Field of Classification Search
USPC ...................... 345/173–178; 178/18.01–19.07
See application file for complete search history.

(56) References Cited

U.S. PATENT DOCUMENTS

| | | | |
|---|---|---|---|
| 5,825,352 A * | 10/1998 | Bisset et al. | 345/173 |
| 2002/0015024 A1* | 2/2002 | Westerman et al. | 345/173 |
| 2002/0030667 A1* | 3/2002 | Hinckley et al. | 345/173 |
| 2002/0063688 A1* | 5/2002 | Shaw et al. | 345/163 |
| 2006/0026521 A1* | 2/2006 | Hotelling et al. | 715/702 |

\* cited by examiner

*Primary Examiner* — Michael Pervan
(74) *Attorney, Agent, or Firm* — Rosenberg, Klein & Lee

(57) ABSTRACT

A touchpad includes a controller connected to a touch sensor. The controller detects the fingers touching on the touch sensor to determine to start up and terminate a scroll bar control function. In the scroll bar control function, the movement of the finger or fingers touching on the touch sensor is detected for scrolling on a window, and the vertical distance and the horizontal distance of the movement are evaluated for determining the scrolling amount of a vertical scroll bar or a horizontal scroll bar of the window.

33 Claims, 6 Drawing Sheets

METHOD FOR SCROLL BAR CONTROL ON A TOUCHPAD AND TOUCHPAD WITH SCROLL BAR CONTROL FUNCTION

REFERENCE TO RELATED APPLICATIONS

This patent application is a Continuation-in-Part application of Ser. No. 11/171,430, filed 1 Jul. 2005, currently pending.

FIELD OF THE INVENTION

The present invention is related generally to a scroll bar operating method and particularly to a method for scroll bar control on a touchpad.

BACKGROUND OF THE INVENTION

Recently, due to the advantages of simple, light and low cost, the touchpad has been widely applied in various electronic products to replace the conventional input devices, for example the computer mouse. A method and apparatus for scroll bar control is proposed by U.S. Pat. No. 5,943,052 to Allen et al., to define scroll regions on a touchpad for scrolling the scroll bars of a window. Specifically, as shown in FIG. 1, on a touchpad 10 there are a block 12 to be defined for cursor control region, a block 14 to be defined for vertical scroll region, and a block 16 to be defined for horizontal scroll region. When a user is to move a cursor, he needs to put his finger in the cursor control region 12 first, and then to move his finger in the cursor control region 12 to control the movement of the cursor. When a user is to scroll a window in the vertical direction, he is requested to put his finger in the vertical scroll region 14 first, and then to vertically move his finger in the vertical scroll region 12 to control the vertical scroll bar of the window. Similarly, to scroll a window in the horizontal direction, a user is requested to put his finger in the horizontal scroll region 16 first and then to horizontally move his finger in the horizontal scroll region 16. However, defining the vertical scroll region 14 and the horizontal scroll region 16 will reduce the area of the cursor control region 12, and therefore have the operations in the cursor control region 12 more difficult. Moreover, the vertical scroll region 14 and the horizontal scroll region 16 cannot be enabled to use at a same time. Further, each time to switch between the cursor control function and the scroll bar control functions, for example from the cursor control function to the vertical scroll bar control function or from the vertical scroll bar control function to the horizontal scroll bar control function, the user is necessary to have his finger leaving the touchpad 10 from the current region first and then touching on the touchpad 10 in another region again, to terminate the current control function and to start up the next control function. For example, slipping the finger on the touchpad 10 from the cursor control region 12 to either the vertical scroll region 14 or the horizontal scroll region 16 will not enable any scroll bar control functions. More disadvantageously, to avoid the finger to put in a wrong region when switching between difference control functions, the user needs to move his eyes from the monitor to the touchpad 10 to ensure the position where his finger is touching on again and again.

On the other hand, a method is proposed by U.S. Pat. No. 5,825,352 to Bisset et al., by sensing the number of fingers landing on a touchpad to emulate mouse buttons and mouse operations. However, this art cannot provide any scroll bar control functions by operating on a touchpad.

Therefore, it is desired a method using multiple fingers for scroll bar control on a touchpad.

SUMMARY OF THE INVENTION

One object of the present invention is to provide a method for scroll bar control on a touchpad.

In a method for scroll bar control on a touchpad, according to the present invention, the fingers touching on the touchpad are detected, and if the number of the fingers is equal to or more than a first threshold, a scroll bar control function starts up. In the scroll bar control function, the movement of the finger or fingers touching on the touchpad is detected, and the vertical distance and the horizontal distance of the movement are evaluated for determining the scrolling amount of a vertical scroll bar or a horizontal scroll bar of a window. Moving the fingers to leave the number of the fingers touching on the touchpad less than a second threshold will terminate the scroll bar control function.

Alternatively, the difference between the vertical distance and the horizontal distance is evaluated to determine the scrolling amount of the vertical scroll bar or the horizontal scroll bar. If the vertical distance is larger than the horizontal distance over a reference, the vertical scroll bar of the window is scrolled by a scrolling amount proportional to the difference. If the horizontal distance is larger than the vertical distance over the reference, the horizontal scroll bar of the window is scrolled by a scrolling amount proportional to the difference.

Alternatively, if the vertical distance is larger than the horizontal distance over a reference, the vertical scroll bar of the window is scrolled by a scrolling amount proportional to the vertical distance, and if the horizontal distance is larger than the vertical distance over the reference, the horizontal scroll bar of the window is scrolled by a scrolling amount proportional to the horizontal distance.

Preferably, once the scroll bar control function starts up, the method according to the present invention allows a user to leave only a finger slipping on the touchpad to scroll a vertical or horizontal scroll bar.

By detecting the number of fingers touching on the touchpad to switch between different control functions, the method according to the present invention does not need to define vertical and horizontal scroll regions on a touchpad, and does not request the user to move his eyes to the touchpad all the time in use. Moreover, the vertical and horizontal scroll bars may be simultaneously operated by only a movement of finger or fingers on a touchpad.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figures 1, 2:
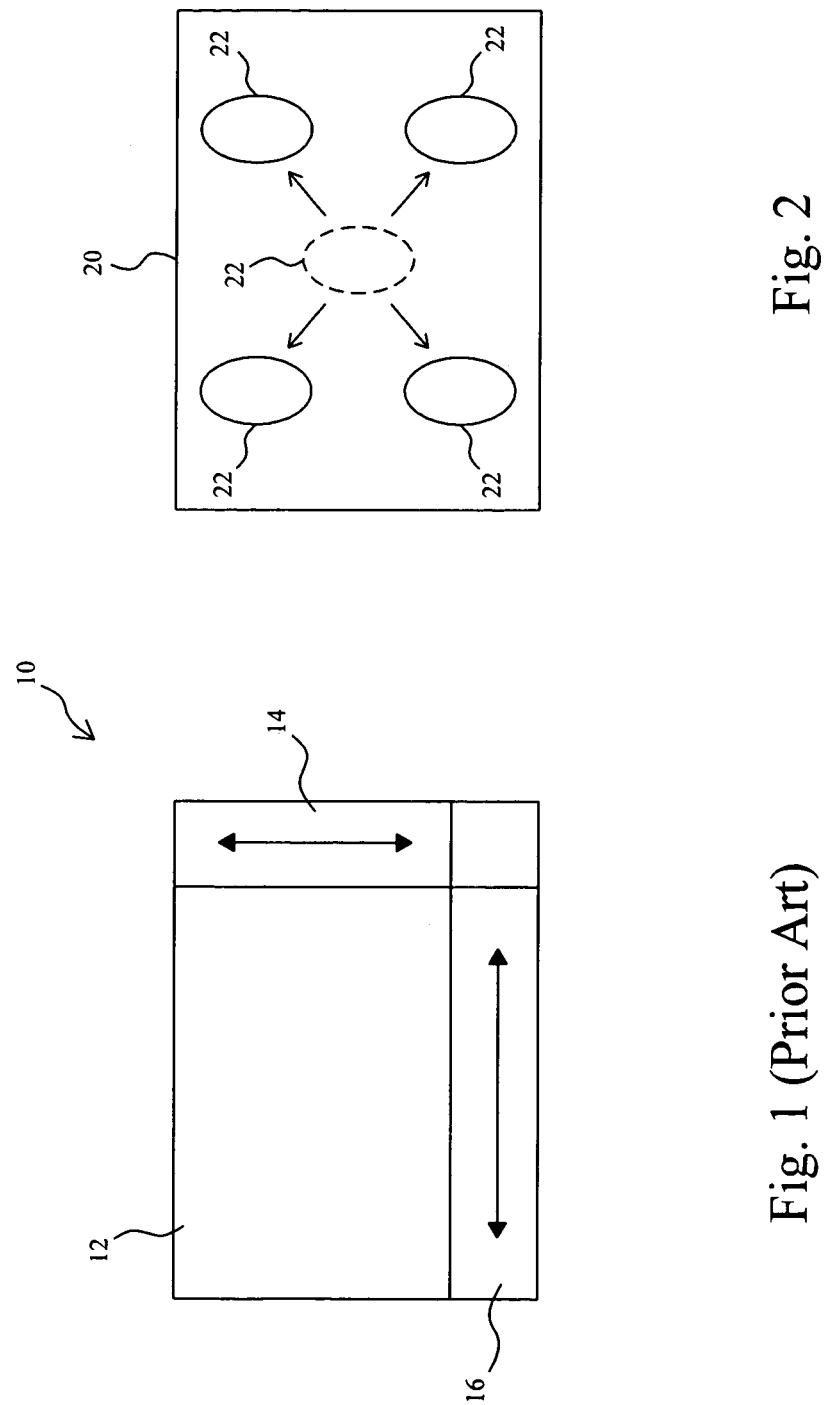
FIG. 1 shows a conventional touchpad serving as a computer mouse.
FIG. 2 shows a touchpad serving as an input device communicated with a host system according to the present invention.
Figure 3:
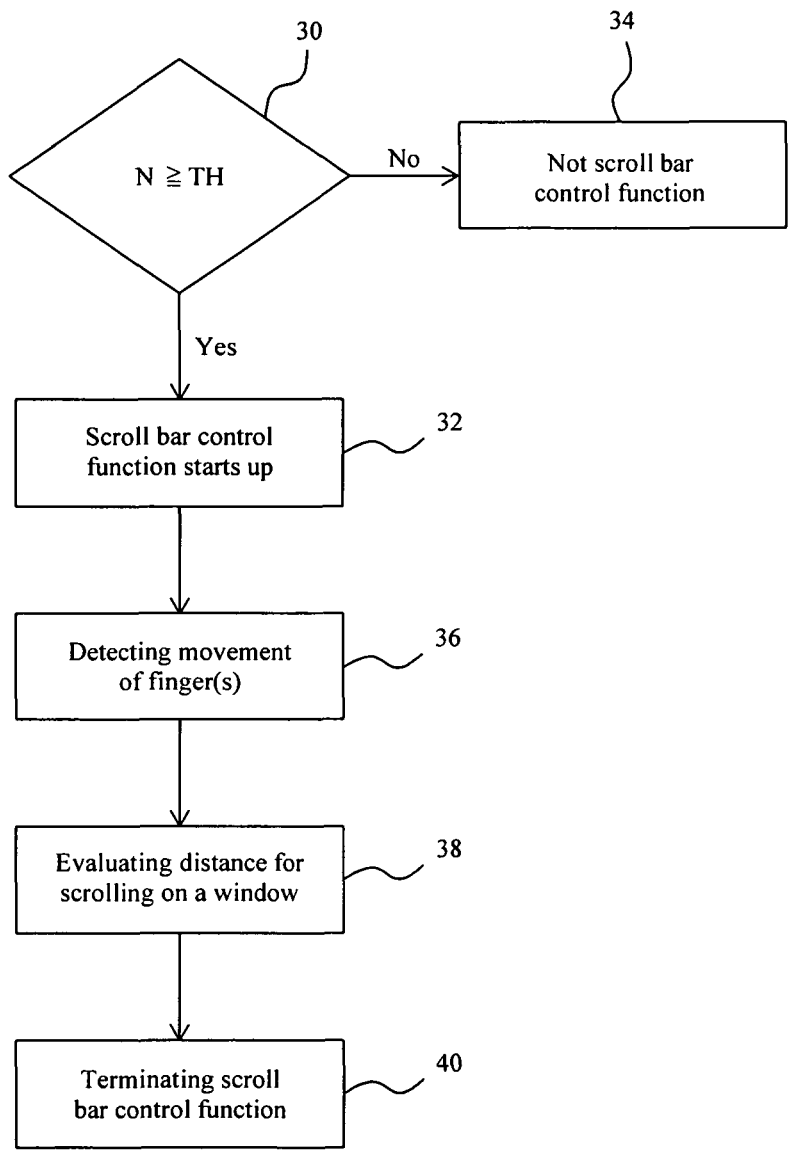
FIG. 3 shows a flowchart of a method for scroll bar control on the touchpad of FIG. 2 according to the present invention.
Figure 5:
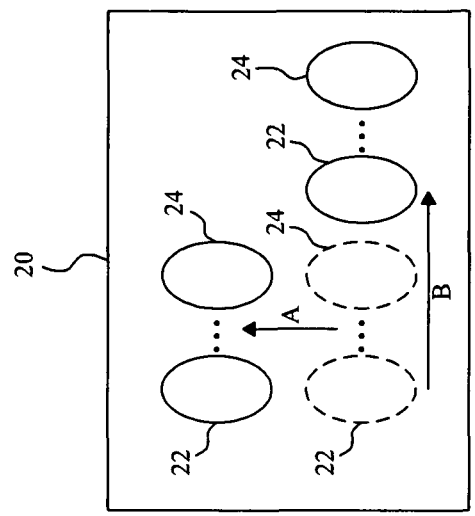
FIG. 5 is a diagram of slipping the fingers on the touchpad of FIG. 2 upward and rightward to scroll on a window.
Figure 4:
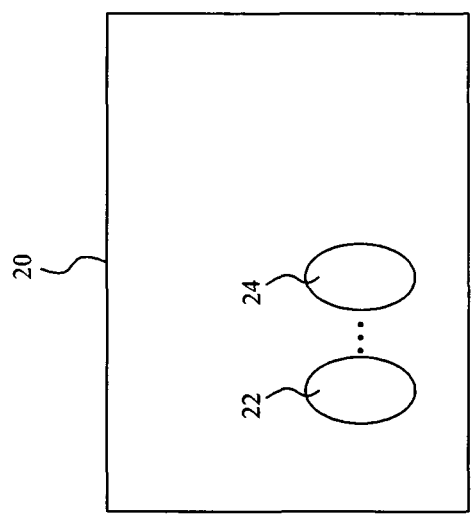
FIG. 4 shows several fingers touching on the touchpad of FIG. 2 to start up a scroll bar control function.

FIG. 2 shows a touchpad 20 serving as an input device communicated with a host system according to the present invention, on which a finger 22 is slipping in arbitrary directions for cursor movement control on a window of an application running on the host system. FIG. 3 shows a flowchart of a method for scroll bar control on the touchpad 20 according to the present invention. In step 30, it is detected if the fingers (number N) touching on the touchpad 20 is equal to or more than a threshold TH for example two, and if it is (N≥TH), go to step 32 for a start-up of a scroll bar control function, otherwise go to step 34 for other or no operations. When a user desires for scroll bar control on the touchpad 20, the only thing to do is to put his one or more other fingers 24 on the touchpad 20, as shown in FIG. 4, such that the fingers 22-24 touching on the touchpad 20 are equal to or more than the predetermined threshold TH. Once the fingers 22-24 touching on the touchpad 20 are detected equal to or more than the threshold TH, the touchpad 20 is switched from the cursor control function to the scroll bar control function. After switching to the scroll bar control function, as shown in FIG. 5, it is detected the movement of the fingers 22-24 on the touchpad 20 in step 36. When the fingers 22-24 slipping on the touchpad 20, the distance of the movement will be evaluated in step 38, for example a distance A of an upward movement or a distance B of a rightward movement, as shown in FIG. 5, and then a signal is generated to send to the host system for scrolling on the window, in which the scrolling amounts of the vertical and horizontal scroll bars of the window are determined with the distances A and B respectively, preferably in a proportional manner. In addition to moving in the vertical and horizontal directions as shown in FIG. 5, the fingers 22-24 may be slipping on the touchpad 20 in an arbitrary direction $\vec{a}$, as shown in FIG. 6, and the scrolling direction and the scrolling amount of the window may be determined by various schemes, for example illustrated by three embodiments in the following:

First Embodiment of Scroll Bar Control

Figure 6:
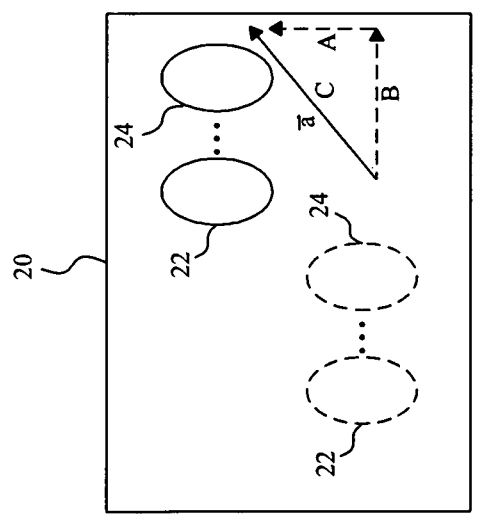
FIG. 6 is a diagram of slipping the fingers on the touchpad of FIG. 2 in an arbitrary direction to scroll on a window.

Referring to FIG. 6, the vertical component A and the horizontal component B of the distance C of the movement in the direction $\vec{a}$ are first evaluated, and in the signal sent to the host system for scroll bar control, the vertical and horizontal scroll bars of the window are scrolled simultaneously, with a vertical scrolling amount proportional to the distance A and a horizontal scrolling amount proportional to the distance B.

Second Embodiment of Scroll Bar Control

Referring to FIG. 6, the vertical component A and the horizontal component B of the distance C of the movement in the direction $\vec{a}$ are first evaluated, and the difference D between the distances A and B are further evaluated. If the vertical distance A is larger than the horizontal distance B over a reference R, i.e., D=(A−B)>R, then the vertical scroll bar of the window is scrolled, and the scrolling amount of the vertical scroll bar is proportional to the difference D. On the contrary, if the horizontal distance B is larger than the vertical distance A over the reference R, i.e., D=(B−A)>R, then the horizontal scroll bar of the window is scrolled, and the scrolling amount of the horizontal scroll bar is proportional to the difference D.

Third Embodiment of Scroll Bar Control

Referring to FIG. 6, the vertical component A and the horizontal component B of the distance C of the movement in the direction $\vec{a}$ are first evaluated, and the distances A and B are compared to each other. If the vertical distance A is larger than the horizontal distance B over a reference R, i.e., (A−B)>R, then the vertical scroll bar of the window is scrolled by a scrolling amount proportional to the vertical distance A. On the contrary, if the horizontal distance B is larger than the vertical distance A over the reference R, i.e., (B−A)>R, then the horizontal scroll bar of the window is scrolled by a scrolling amount proportional to the horizontal distance B.

Figure 7:
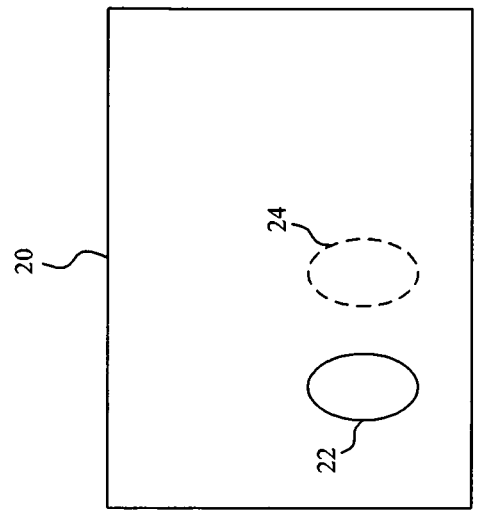
FIG. 7 is a diagram of leaving only a finger touching on the touchpad of FIG. 2 to scroll on a window.
Figure 8:
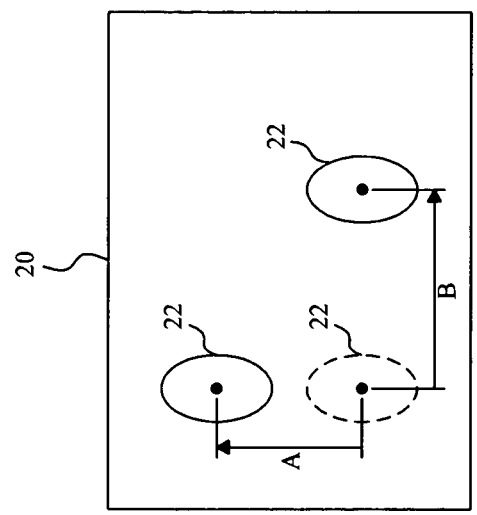
FIG. 8 is a diagram of slipping a finger on the touchpad of FIG. 2 for scrolling on a window.

Referring back to FIG. 3, in step 40, the scroll bar control function will be terminated if the fingers touching on the touchpad 20 are equal to or less than a threshold for example zero. In the case of a zero threshold, all the fingers 22-24 leaving the touchpad 20 will terminate the scroll bar control function. After terminating the scroll bar control function, if a finger 22 is touching on the touchpad 20 again, the touchpad 20 will be switched to the cursor control function, while if several fingers 22-24 equal to or more than the threshold TH are touching on the touchpad 20 again, the touchpad 20 will be switched back to the scroll bar control function as illustrated in FIG. 3. In another embodiment, after the start-up of a scroll bar control function by several fingers 22-24 touching on the touchpad 20 as shown in FIG. 4, the finger or fingers 24 may be removed from the touchpad 20 for leaving only the finger 22 still touching on the touchpad 20 as shown in FIG. 7, and then slipping the finger 22 on the touchpad 20 for scrolling on a window as shown in FIG. 8.

Figure 9:
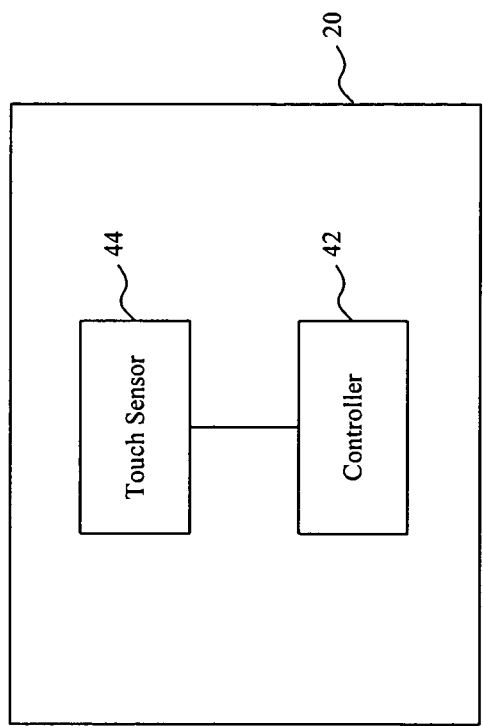
FIG. 9 is a touchpad according to the present invention.

FIG. 9 is a touchpad 20 according to the present invention, in which a controller 42 is connected to a touch sensor 44 to detect the number of fingers touching on the touch sensor 44. If the number of fingers touching on the touch sensor 44 is equal to or larger than a threshold, the controller 25 will start up a scroll bar control function, in which the controller 25 detects the movement of the one or more fingers slipping on the touch sensor 44 for scrolling on a window accordingly. As shown in the above embodiments, the controller 42 evaluates the vertical distance and the horizontal distance of the movement for determining the scrolling amount of the vertical scroll bar or the horizontal scroll bar of the window in the scroll control function, and terminates the scroll bar control function if the number of the fingers touching on the touch sensor 44 becomes less than a second threshold. In an embodiment, the controller 42 evaluates the difference between the vertical distance and the horizontal distance to determine the scrolling amount of the vertical scroll bar or the horizontal scroll bar. If the vertical distance is larger than the horizontal distance over a reference, the vertical scroll bar of the window is scrolled by a scrolling amount proportional to the difference. Otherwise, if the horizontal distance is larger than the vertical distance over the reference, the horizontal scroll bar of the window is scrolled by a scrolling amount proportional to the difference. In another embodiment, if the controller 42 detects that the vertical distance is larger than the horizontal distance over a reference, the vertical scroll bar of the window is scrolled by a scrolling amount proportional to the vertical distance, and otherwise, if the horizontal distance is larger than the vertical distance over the reference, the horizontal scroll bar of the window is scrolled by a scrolling amount proportional to the horizontal distance.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set fourth in the appended claims.

What is claimed is:

1. A touch device, comprising:
   a touch sensor; and
   said touch device having a scroll bar control function for detecting a number of fingers touching on the touch sensor;
   wherein if the number of fingers is equal to or larger than a first threshold, the touch device will start up the scroll bar control function independent of a sliding-movement of the fingers, and detect a movement of the fingers on the touch sensor for scrolling on a window accordingly in the scroll bar control function;
   wherein the first threshold is larger than one.

2. The touch device according to claim 1, wherein the first threshold is two.

3. The touch device according to claim 1, wherein the scroll bar control function is continued if the number of fingers touching on the touch sensor is not less than a second threshold which is larger than zero and is equal to or less than the first threshold.

4. The touch device according to claim 1, wherein the scroll bar control function is terminated once the number of fingers touching on the touch sensor is equal to or less than a second threshold which is less than the first threshold.

5. The touch device according to claim 4, wherein the second threshold is equal to or less than one.

6. The touch device according to claim 1, wherein a vertical distance and a horizontal distance of the movement for scrolling a vertical scroll bar and a horizontal scroll bar on the window, are respectively evaluated.

7. The touch device according to claim 1, wherein a vertical distance and a horizontal distance of the movement are evaluated for scrolling a vertical scroll bar on the window if the vertical distance is larger than the horizontal distance over a first reference, or scrolling a horizontal scroll bar on the window if the horizontal distance is larger than the vertical distance over a second reference.

8. The touch device according to claim 7, wherein a scrolling amount for the vertical scroll bar is determined in proportion to a difference between the vertical distance and the horizontal distance.

9. The touch device according to claim 7, wherein a scrolling amount for the vertical scroll bar is determined in proportion to the vertical distance.

10. The touch device according to claim 7, wherein a scrolling amount for the horizontal scroll bar is determined in proportion to a difference between the horizontal distance and the vertical distance.

11. The touch device according to claim 7, wherein a scrolling amount for the horizontal scroll bar is determined in proportion to the horizontal distance.

12. A touch device, comprising:
    a touch sensor; and
    said touch device having a window scrolling control function for detecting a number of fingers touching on the touch sensor;
    wherein if the number of fingers is equal to or larger than a first threshold which is larger than one, the touch device will start up the window scrolling control function independent of a sliding movement of the fingers, and detect a movement of the fingers on the touch sensor for scrolling a window accordingly in the window scrolling control function.

13. The touch device according to claim 12, wherein the first threshold is two.

14. The touch device according to claim 12, wherein the window scrolling control function is continued if the number of fingers touching on the touch sensor is not less than a second threshold which is larger than zero and is equal to or less than the first threshold.

15. The touch device according to claim 12, wherein the window scrolling control function is terminated once the number of fingers touching on the touch sensor is equal to or less than a second threshold which is less than the first threshold.

16. The touch device according to claim 15, wherein the second threshold is equal to or less than one.

17. The touch device according to claim 12, wherein a vertical distance and a horizontal distance of the movement for scrolling the window in a vertical direction and a horizontal direction, are respectively evaluated.

18. The touch device according to claim 12, wherein a vertical distance and a horizontal distance of the movement are evaluated for scrolling the window in a vertical direction if the vertical distance is larger than the horizontal distance over a first reference, or scrolling the window in a horizontal direction if the horizontal distance is larger than the vertical distance over a second reference.

19. The touch device according to claim 18, wherein a scrolling amount for scrolling the window in the vertical direction is determined in proportion to a difference between the vertical distance and the horizontal distance.

20. The touch device according to claim 18, wherein a scrolling amount for scrolling the window in the vertical direction is determined in proportion to the vertical distance.

21. The touch device according to claim 18, wherein a scrolling amount for scrolling the window in the horizontal direction is determined in proportion to a difference between the horizontal distance and the vertical distance.

22. The touch device according to claim 18, wherein a scrolling amount for scrolling the window in the horizontal direction is determined in proportion to the horizontal distance.

23. A method for window scrolling control on a touch device having a touch sensor, comprising the steps of:
    detecting a number of fingers touching on the touch sensor;
    starting up a window scrolling control function independent of a sliding movement of the fingers if the number of fingers is equal to or larger than a first threshold which is larger than one; and
    detecting a movement of the fingers on the touch sensor for scrolling a window accordingly in the window scrolling control function.

24. The method according to claim 23, wherein the first threshold is two.

25. The method according to claim 23, further comprising continuing the window scrolling control function if the number of fingers touching on the touch sensor is not less than a second threshold which is larger than zero and is equal to or less than the first threshold.

26. The method according to claim 23, further comprising terminating the window scrolling control function once the number of fingers touching on the touch sensor is equal to or less than a second threshold which is less than the first threshold.

27. The method according to claim 26, wherein the second threshold is equal to or less than one.

28. The method according to claim 23, further comprising evaluating a vertical distance and a horizontal distance of the movement for scrolling the window in a vertical direction and a horizontal direction, respectively.

29. The method according to claim 23, further comprising evaluating a vertical distance and a horizontal distance of the movement for scrolling the window in a vertical direction if the vertical distance is larger than the horizontal distance over a first reference, or scrolling the window in a horizontal direction on the window if the horizontal distance is larger than the vertical distance over a second reference.

30. The method according to claim 29, further comprising determining a scrolling amount for scrolling the window in the vertical direction in proportion to a difference between the vertical distance and the horizontal distance.

31. The method according to claim 29, further comprising determining a scrolling amount for scrolling the window in the vertical direction in proportion to the vertical distance.

32. The method according to claim 29, further comprising determining a scrolling amount for scrolling the window in the horizontal direction in proportion to a difference between the horizontal distance and the vertical distance.

33. The method according to claim 29, further comprising determining a scrolling amount for scrolling the window in the horizontal direction in proportion to the horizontal distance.

\* \* \* \* \*